May 3, 1960

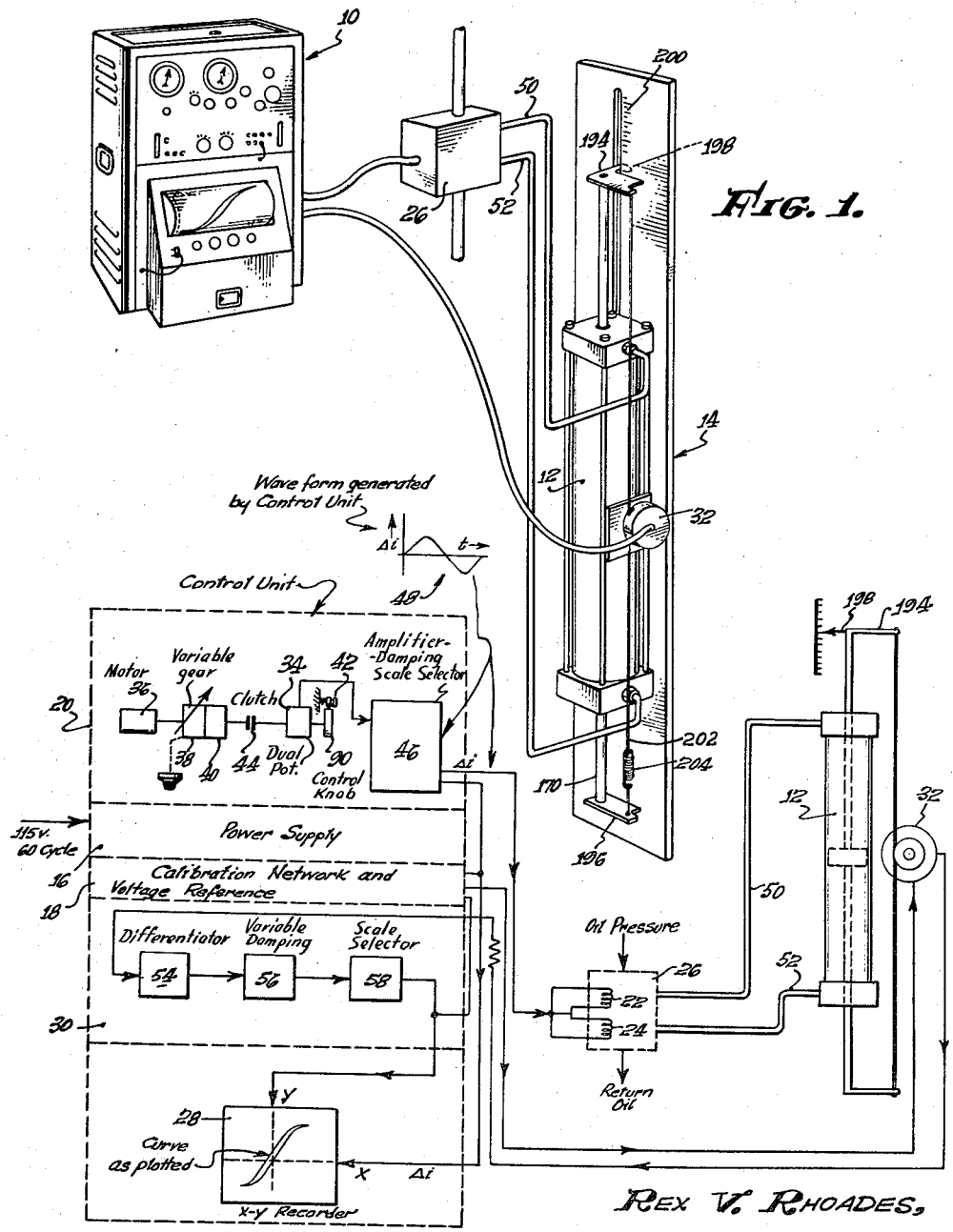

R. V. RHOADES 2,934,938

VALVE FLOW ANALYZERS

Filed Feb. 1, 1956

REX V. RHOADES,
INVENTOR.

BY

Boniard J. Brown

ATTORNEY.

United States Patent Office 2,934,938
Patented May 3, 1960

2,934,938

VALVE FLOW ANALYZERS

Rex V. Rhoades, Pomona, Calif., assignor to Industrial Measurements Corporation, Pomona, Calif., a corporation of California Application February 1, 1956, Serial No. 562,862

15 Claims. (Cl. 73—3)

This invention relates generally to testing apparatus; more particularly it relates to a novel apparatus for testing electro-hydraulic transfer valves and for measuring flow through such valves as a function of valve-energizing current.

Methods and types of apparatus known to the art for testing electro-hydraulic flow regulating valves have certain disadvantages and shortcomings. Available types of testing apparatus generally do not provide the information necessary for the detection of many valve defects or malfunctions and for the measurement of true volumetric flow through such valves with varying valve-energizing current. Known devices do not provide a continuous reading or record of valve output flow as a function of varying energizing current imposed upon the torque motor or solenoid of a valve under test. It is therefore impossible, using such devices, efficiently to diagnose many valve malfunctions. It is necessary to scrap or to disassemble and reassemble valves with minor deficiencies. Furthermore, known testing equipment does not provide a recorded log of fluid flow as a dynamic function of valve-energizing current. This precludes analysis of valve performance under dynamic operating conditions.

Known devices and methods generally can be utilized to obtain a plot of flow versus valve-energizing current, only through the procedure of plotting a number of individual flow measurements at particular static values of current. This procedure is time-consuming and requires skill on the part of the operator. Furthermore, such measurements do not give an accurate picture of dynamic operation, especially in the "null" region, the region of zero flow where the energizing current changes direction.

Conventional techniques generally rely upon measurement of flow by means of a rotameter or upon flow measurement in a low pressure return line. Such methods necessitate carefully controlled test conditions. A rotameter must be recalibrated for changes in viscosity and temperature. The glass tube of a rotameter cannot withstand high fluid pressures. Measurement of inlet or return flow results in inaccuracy to the extent of valve internal leakage.

It is, therefore, a principal object of the present invention to provide an apparatus for testing electro-hydraulic valves which obviates the aforementioned disadvantages of known types of apparatus and which automatically and continuously records varying volumetric flow during dynamic valve operation.

It is a principal object of the present invention to provide a valve testing apparatus including novel means for measuring true volumetric flow through the actuator parts of a valve under test.

It is an important object of the present invention to provide a valve testing apparatus embodying a novel volume differentiation device which permits the continuous measurement and recording of volumetric flow as a function of varying valve operating current, thereby exhibiting characteristics of a valve under test.

Another important object of the present invention is to provide an apparatus for testing electro-hydraulic valves, the proper functioning of which is substantially independent of, and which does not require recalibration for, changes in fluid, viscosity, and temperature.

Another object of the present invention is the provision of an electro-hydraulic valve testing apparatus capable of measuring flow at any desired fluid pressure level.

Another object of the present invention is the provision of a valve testing apparatus capable of high accuracy and resolution over a very wide range of flow.

Another object of the instant invention is to provide a valve testing device which is simple and automatic in operation, requiring a minimum of skill and time of an operator.

Another object of the present invention is the provision of a valve testing device which enables accurate and rapid analysis of valve defects, by recording flow versus valve operating current through a cycle of valve operation in an extremely short time interval, a typical flow plot requiring only ten to fifteen seconds.

A further object of the present invention is to provide a valve testing apparatus which may selectively be operated through a cycle of valve-operating current, or which may be manually operated to permit study of valve characteristics at selected points of the operating range. A typical characteristic for such study would be the sensitivity of flow resolution, i.e., incremental flow change responsive to incremental current change at a given point.

A further object of the instant invention is the provision of a valve testing device capable of operating with a very small pressure drop thereacross.

A still further object of the present invention is the provision of an electro-hydraulic valve testing apparatus having a plurality of current and flow reading and recording sensitivity, selective to vary the ranges of flow and current capable of being measured and recorded, and having means for easy calibration of the measurement means and the recorder.

Other objects and features of the present invention, as well as many advantages thereof, will become apparent to those skilled in the art from a consideration of the following description, the appended claims, and the accompanying drawings in which:

Figure 1 is a perspective view of a preferred embodiment of the present invention, showing an electro-hydraulic valve in operative testing position;

Figure 2 is a block diagram showing the arrangement of the components of this embodiment;

In all figures of the drawings like numerals are used to designate like parts and features for convenience of explanation.

Figures 3, 4:
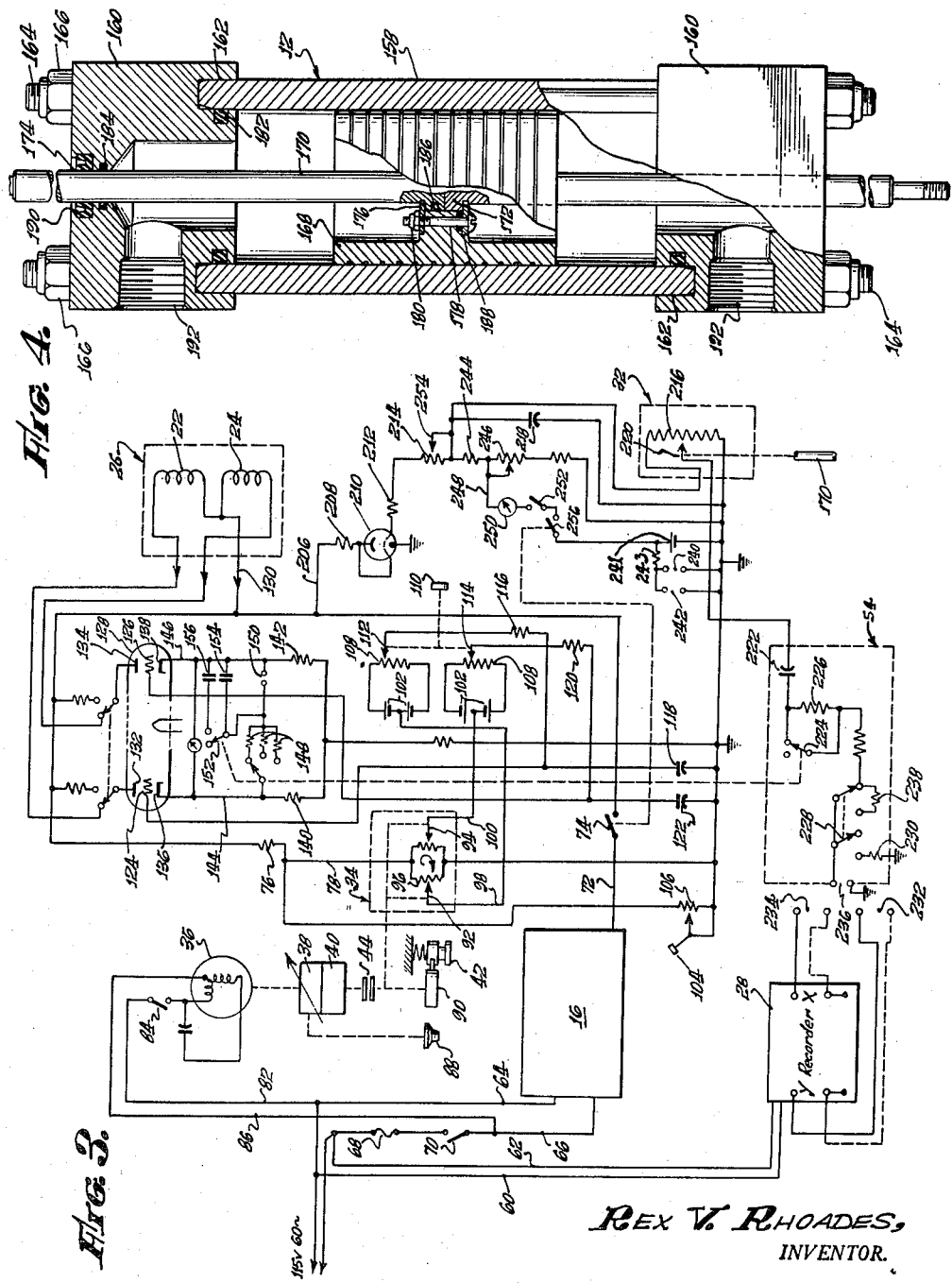
Figure 3 is a schematic diagram of the electrical system of the present invention.
Figure 4 is an elevational view, partially in section, of a metering cylinder of the present invention.

Referring to the drawings and particularly to Figures 1 and 2 thereof, a preferred embodiment of the present invention is shown as comprising an electrical system housed in a casing 10 and a metering unit 12 mounted upon a suitable frame 14. The electrical system includes a conventional D.C. power supply 16, calibration and voltage reference circuitry 18, and a system 20 for generating a cycle of valve-operating current. This generating system is adapted to provide for selective variation in the period of the cycle and for selective control of the amplitude and bias of the valve-operating differential current supplied to coils 22 and 24 of servo-valve 26. The generating system 20 also supplies to the horizontal axis of a conventional two-axis recorder 28, a signal proportional to the valve-operating current. The electrical system also includes differentiating, damping and scale selection circuit 30, the input to which is a voltage signal from potentiometer 32. This voltage is proportional to fluid volume displacement of the piston within metering cylinder 12 and is differentiated by circuit 30. The output from circuit 30 to the vertical axis of recorder 28 is therefore a signal proportional to volume displacement within metering cylinder 12 and to flow through valve 26, because the signal is the derivative of volume or piston displacement with respect to time and is therefore proportional to fluid flow.

Considering generally the production of input signal for recorder 28, a voltage is first applied across the resistance element of precision wire-wound double wiper potentiometer 34. The contact wipers of this potentiometer are rotated by induction motor 36 at a velocity which is selectively controlled by means of the variable gear system 38. The wipers are caused to rotate through one revolution by depressing push button 42. This allows rotation of the shaft on which the wipers are mounted to be rotated through slip clutch 44 until a simple mechanism stops the rotation after one revolution. The revolution produces a pair of cyclic angularly-shaped voltage signal wave forms, one from each wiper. The signals are identical and are phased 180° apart. The signals are the input to the amplifying and variable damping circuit 46, the output of which is a differential current, the wave form of which is indicated by the numeral 48. This differential current energizes the coils 22 and 24 of the solenoids or torque motor of servo-valve 26. A signal proportional to the differential current is simultaneously applied at the horizontal axis of recorder 28. Energization causes movement of a spool or analogous member in the valve to move in response to the differential current, thus permitting fluid flow through the actuator ports of the valve from an external source (not shown). Hydraulic lines 50 and 52 are connected between the actuator ports and opposite ends of metering cylinder 12 to permit bi-directional flow. Fluid flow causes volumetric displacement of the piston in metering cylinder 12. A voltage signal proportional to this displacement is conducted from potentiometer 32 to differentiator 54, which, as noted above, produces a signal proportional to flow through the actuator ports of the valve under test. This signal passes through variable damping and scale selector circuitry 56 and 58 and then serves as input to the vertical axis of recorder 28. It is thus apparent that the recorder will produce a plot of flow through the valve actuator ports as a function of differential energizing current through a complete cycle of valve operation.

Figure 3 illustrates the arrangement of the specific components of the electronic system of the present invention, and reference is made thereto for purposes of the specific description which follows.

In the operation of the embodiment of the present invention shown in Figure 3, 115 volt, 60 cycle, power is supplied through conductors 60 and 62 to recorder 28 and through conductor 64, conductor 66, fuse 68 and switch 70 to the conventional D.C. power supply unit 16. The D.C. output of this unit is applied across the resistance elements of the precision wire-wound double wiper potentiometer 34 through conductor 72, switch 74, dropping resistor 76 and conductor 78.

115 volt, 60 cycle, power is supplied to induction motor 36 through conductor 82, switch 84 and line 86. Variable gear 38 is mechanically linked to motor 36 and is adjustable by control knob 88 to permit the selection of the rotational velocity transmitted to fixed gear 40. Any suitable means, such as slip-clutch 44, spring-set push button 42 and rotatable control knob 90 keyed to button 42, are provided to effect, upon initiation by an operator, a single complete revolution of contact wipers 92 and 94 about the circumference of resistance element 96 of potentiometer 34. With push button 42 in normal position, the projecting key on knob 90 rests against button 42, as shown, and clutch 44 is caused to slip. When button 42 is depressed and released, the key on rotatable knob 90 rides in the circumferential groove in button 42 until it clears button 42. Button 42 then springs back to normal position. After knob 90 makes one revolution, the key again comes to rest against button 42, thus preventing further rotation. It is obvious that the system just described permits accurate adjustment of the period of rotation of the contact wipers and provides for a single revolution of the wipers about the resistance element of the potentiometer upon initiation of rotation.

During the single revolution of contact wipers 92 and 94, a voltage wave form is generated in each wiper. Rotary potentiometer 34 is so designed that this wave form consists of a linear portion extending from zero voltage to a maximum in one direction, a linear portion extending from this maximum through zero voltage to a maximum in the opposite direction, and a third linear portion extending from this maximum to zero voltage. Each wave form is thus composed of two angularly-shaped portions. They are 180° out of phase with respect to each other. The outputs of wipers 92 and 94 are impressed upon voltage cells 102 through conductors 98 and 100, as shown. Cells 102 allow shifting of D.C. bias by an amount equal to cell voltage. The amplitudes of the angularly-shaped wiper outputs are selectively adjustable by means of knob 104, which controls the adjustment of potentiometer 106. Two ganged potentiometers 108 are provided as shown to permit adjustment of the bias levels. The bias levels are simultaneously adjustable by equal amounts and in opposite directions by means of knob 110, mechanically linked to contactors 112 and 114. Any undesired A.C. components of the resulting biased voltage signal are obviously damped by the two resistance-capacitance combinations formed by elements 116, 118, 120, and 122.

The voltage outputs from contactors 112 and 114 of ganged potentiometers 108 are respectively imposed upon grids 124 and 126 of double triode tube 128, through conductors as shown. Each grid obviously controls the flow of current in the circuit with which it is associated. Grid 124 by permitting current to pass between cathode 136 and plate 132, serves to complete a circuit from power supply 16 through switch 74, valve coil 22, triode plate 132 and cathode 136, the current passing to ground through conductor 144 and resistor 140. Analogously, grid 126 serves to complete a circuit from power supply 16 through switch 74, valve coil 24, triode plate 134 and cathode 138, the current similarly passing to ground through conductor 146 and resistance 142. It is obvious that current flow through each triode of double triode 128 is responsive to voltage imposed upon the grid of that triode and is 180° out of phase with that voltage. Thus the current through each of the circuits just described has the same wave form as the voltage applied to the grid. The current through coil 22 is 180° out of phase with the current through coil 24. The net differential current impressed upon coils 22 and 24, being the resultant of the two coil currents, has the wave form indicated by numeral 48 in Figure 2 and is designated by the symbol $\Delta i$. This cycle of differential current serves to actuate valve 26 through a complete cycle of operation.

The differential voltage between conductors 144 and 146 is directly proportional to the differential current passing through valve coils 22 and 24. This is because the current in conductor 144 passes through precision dropping resistor 140 and that in conductor 146 passes through precision dropping resistor 142. Recorder socket 150, adapted for engagement with recorder X-axis plug 234, has this differential voltage impressed upon it through a switch-selected resistor 148. Switch selective resistors 148 make possible the selection of recording sensitivity before voltage is imposed across plug 234 of recorder 28. This voltage attenuation is effected by virtue of the fact that the switch-selected resistor 148 is in series with the precisely-known internal resistance of recorder 28.

Switch 152 provides means for selective damping of the voltage signal supplied to recorder socket 150. It permits the selection of the capacitance in parallel with the recorder internal resistance, capacitor 154 being one alternative and the parallel combination of capacitors 154 and 156 being the other alternative. The purpose of this selective damping is to provide optimum signal-to-noise ratio for a particular cyclical period of differential current. With a short period (i.e., 10 seconds), low damping can be utilized to preserve accuracy, while with a longer period (i.e., 60 seconds) higher damping may be utilized while preserving accuracy.

It will be observed that the above described circuitry provides an effective cycle of differential current to the coils of a servo-valve under test while providing for the recording of this differential current on an axis of a two-axis recorder.

An important feature of the present invention is the precision fluid-metering unit or cylinder. Referring to Figure 4, details of a preferred embodiment of this metering cylinder will be evident upon inspection. The metering unit 12 includes a precision lapped cylindrical tube 158 sealed at its end by cylinder heads 160. The heads are provided with annular grooves adapted to accommodate the abutting ends of tube 158 and are retained by any suitable means, such as tie rods 164 and nuts 166. A piston 168 is mounted for reciprocation within tube 158 and has a large surface area contacting the inner surface of tube 158, this surface being precision machined and lapped so that minimum frictional resistance and leakage will result upon movement of the piston within tube 158. A small diameter piston rod 170, having a central annular shoulder and being free to reciprocate axially of the cylinder through openings 174 in heads 160 is secured to the piston by means of retaining plates 176, screws 178 and nuts 180. Suitable sealing means such as quad-rings 182, 184, 186 and 188 and V-cup packing 190 are provided in order substantially to eliminate leakage. Heads 160 are provided with ports 192 adapted to receive hydraulic lines 50 and 52 to provide connections to a servo-valve under test.

Referring to Figure 1, a pair of brackets or carrier members 194 and 196, which extend beyond the periphery of tube 158 are secured to the ends of piston rod 170, as shown. Bracket 194 is provided with an indicator pointer 198 which extends through a slot in frame 14 to indicate the position of piston 168 on scale 200. A cable 202, having tensioning spring 204 attached thereto, is fixed at its ends to members 194 and 196 and is coupled through a spool to precision multi-turn slide wire potentiometer 32. It is obvious that this structural arrangement relates instantaneous position of piston 168 to instantaneous position of the contactor of potentiometer 32.

Referring to Figure 3, it is thus apparent that the voltage output at contactor 220 of precision potentiometer 32 is directly proportional to the displacement of piston 168 and to fluid volume displacement through the actuator ports of a servo-valve 26 under test.

The precision resistance winding 216 of potentiometer 32 has a carefully regulated voltage imposed across it. This voltage is supplied by the circuit which extends from power supply 16 through conductor 72, conductor 206, dropping resistor 208, voltage-regulating tube 210, dropping resistor 212, potentiometer 214, and through resistance winding 216 to ground. A.C. components in this circuit are damped by filter capacitance 218.

The output voltage from contactor 220 of potentiometer 32 is applied across a circuit including a precision differentiating capacitor 222, and a precision resistance which includes the accurately known internal recorder resistance, the precision resistor 230 and the resistors serially connected between the capacitor and the recorder. This circuit imposes a voltage signal upon the vertical axis of the recorder which is proportional to the time-rate of the voltage change at contactor 220, and hence is proportional to fluid volume rate of change in cylinder 12.

Fluid volume rate of change is the same as fluid flow through the actuator ports of the valve under test. The signal to the recorder is thus accurately responsive to fluid flow through the actuator ports. To provide the desired accuracy precision capacitor 222 may preferably be a low leakage capacitor having substantially no interfacial polarization.

Switch 224, which operates in conjunction with switch 152, provides selective damping for this flow signal, this damping being equal to the damping applied to the differential current signal. Damping is effected by inserting resistance 226 into the circuit by means of switch 224. Switch 228 permits a selection of flow recording sensitivities by providing for the selective insertion of precision resistor 230 into parallel relation with precisely known internal recorder resistance. It is assumed in the foregoing discussion that recorder plugs 232 and 234 are inserted into sockets 236 and 150 respectively. Resistor 238 is connected in series with the differentiating circuit by switch 228 whenever the recorder resistance is paralleled by resistor 230, in order to keep the total resistance in series with the damping resistors constant regardless of the position of sensitivity selector switch 228.

An important advantage of the present invention is its ease of calibration. Both the vertical and horizontal axes of the recorder may be simultaneously calibrated by reference to a standard cell 241. During calibration procedure, plugs 232 and 234 are inserted into sockets 240 and 242, respectively. The parallel internal resistances of the two axes of the recorder, which are exactly known, are thereby placed in series with precision resistor 243, thus providing an exactly known voltage at the recorder input terminals. Calibration adjustments to both axes of the recorder are then made, in order to produce a predetermined displacement of the recorder pen on each axis.

Primary flow-measurement calibration of the apparatus of the present invention is accomplished by comparing the vertical (flow) axis displacement of the calibrated recorder with the length of time required for piston rod 170 to move through a known displacement under a condition of constant flow through the actuator ports to metering cylinder 12. Because a given flow is a movement of a certain volume in a certain time period (the time-derivative of volume), the constant flow is accurately determinable by dividing the product of a given piston displacement and the difference between the piston and rod cross-sectional area by the time required for the given piston displacement. This actual flow may be compared with the flow indicated on the vertical axis of the recorder. The voltage across potentiometer 32 may be adjusted by means of potentiometer 214 until the measured flow equals the actual flow. The next step in the primary calibration procedure consists in adjusting the contactor position of potentiometer 246 until the voltage in conductor 248 equals the voltage of standard cell 241, as determined by null-reading galvanometer 250 when push button 252 is closed. The contactor of potentiometer 246 is then permanently locked in position and the primary flow calibration is completed.

Secondary calibration, which may be performed during day-to-day use of the equipment, is readily accomplished by closing push button 252 and adjusting the position of contactor 254 of potentiometer 214 so that galvanometer 250 gives a null reading.

It will be apparent from the foregoing description that the present invention represents the discovery of a new principle of servo-valve testing, which permits the accurate and continuous recording of null through positive and negative saturation flow through the actuator ports of a valve under test, as a function of actuating current supplied to the coils of the valve during dynamic operation.

It will further readily occur to those skilled in the art that a number of variations may easily be made to permit the testing of three-way servo-valves, the testing of valves of widely differing characteristics (by using more than one metering cylinder), the testing of single-coil valves, the plotting of flow as a function of valve spool, or piston displacement, the plotting of valve transfer characteristics under loaded conditions (by applying a force to the rod of the metering cylinder), and to permit the performance of other associated and combined functional testing.

Although a specific embodiment of the invention has been described and illustrated in detail, it is to be clearly understood that the same is by way of illustration and example only; it is to be understood that the invention is not limited thereto, as many variations will be readily apparent to those versed in the art and the invention is to be given its broadest possible interpretation within the terms of the following claims.

I claim:

1. A valve flow analyzer comprising electro-mechanical means for generating cyclic current to activate an electro-hydraulic valve under test, means including a resistance electrically connected with said valve for imposing a voltage signal responsive to said current upon a first axis of a two-axis recorder, an hydraulic metering unit hydraulically connected to the actuator ports of said valve and having a piston reciprocal therein by fluid flow, means for producing an electrical signal proportional to piston displacement, and a differentiating circuit serially connected between said signal producing means and the second axis of the two-axis recorder to provide a signal proportional to fluid flow.

2. A valve flow analyzer in accordance with claim 1, and further including means for selective variation of damping time constant to be applied both to said voltage signal and to said flow signal for maintaining optimum recording signal-to-noise ratio.

3. A valve flow analyzer in accordance with claim 1, wherein said means for producing a signal proportional to piston displacement consists of a precision potentiometer coupled to said piston for relating piston displacement to potentiometer wiper position.

4. A valve flow analyzer comprising a metering cylinder having a piston reciprocable in response to fluid flow through the actuator ports of an electro-hydraulic valve under test, electro-mechanical means for generating a single cycle of current to operate said valve, means including a resistance electrically connected with said valve for imposing an electrical signal responsive to said current upon a first axis of a two-axis recorder, a precision potentiometer mechanically coupled to said piston for relating linear position of said piston to potentiometer wiper contact position to produce a voltage signal responsive to piston displacement, and a precision capacitance and a precision resistance arranged to provide a differentiating circuit serially connected between said potentiometer and the second axis of said recorder to produce a voltage proportional to fluid flow through said actuator ports.

5. The valve flow analyzer in accordance with claim 4, wherein said cylinder and said piston are provided with smooth mating surfaces to render said piston moveable by low differential pressure thereacross, and to minimize fluid leakage between said mating surfaces, whereby the velocity of said piston is a function of true volumetric flow.

6. The combination in accordance with claim 4, wherein said precision resistance includes the accurately known internal resistance of the recorder, and wherein said precision capacitor is a low leakage capacitor having substantially no inter-facial polarization.

7. A flow measurement device for testing hydraulic valves comprising a cylindrical tube, said tube being closed at each end and having a port at each end for fluid connection to the ports of a valve under test, a piston disposed within said tube, said piston being movable in response to flow through said tube ports, a piston rod fixedly secured to said piston and extending through openings provided at the ends of said tube, said rod being of substantially smaller diameter than said piston, said tube and said piston being provided with smooth mating surfaces to render said piston moveable by low differential pressure thereacross for minimizing fluid leakage between said mating surfaces to produce piston velocity which is a function of true volumetric flow, transducer means for sensing piston movement, and electrical means connected with the transducer means to produce a signal proportional to said piston velocity and proportional to volumetric flow.

8. A valve flow analyzer comprising a closed flow metering unit having a piston reciprocable within a tube in response to flow into said tube and through the actuator ports of an electro-hydraulic valve under test, a D.C. voltage supply, a two-axis recorder, electro-mechanical means for generating a cycle of differential current for effecting a cycle of operation of said valve, means for adjusting the period, amplitude, and bias of said differential current cycle, means for imposing a voltage responsive to said differential current upon a first axis of said recorder, position pick-off means adapted to produce a voltage proportional to displacement of said piston, and electrical differentiating means serially connected between said pick-off means and a second axis of said recorder, to provide a signal proportional to piston velocity and to fluid flow through said actuator ports of said valve.

9. A valve flow analyzer comprising a two-axis recorder, a cylindrical tube, said tube being closed at each end and having a port at each end for fluid connection to the ports of a valve under test, a piston disposed within said tube, said piston being reciprocable in response to flow through said tube ports, a piston rod fixedly secured to said piston and extending through openings provided at the ends of said tube, said rod being of substantially smaller diameter than said piston, said tube and said piston being so constructed and arranged that flow into said tube produces piston velocity which is a function of true volumetric flow, electro-mechanical means for generating a signal cycle of current to operate said valve means including a resistance electrically connected with said valve for imposing an electrical signal responsive to said current upon a first axis of said two-axis recorder, a precision potentiometer mechanically coupled to said piston for relating linear positon of said piston to potentiometer wiper contact position to produce a voltage signal responsive to piston displacement, and a precision capacitance and a precision resistance arranged to provide a differentiating circuit serially connected between said potentiometer and the second axis of said recorder to produce a voltage proportional to fluid flow through said actuator ports.

10. A valve flow analyzer comprising a two-axis recorder, a D.C. voltage supply, a closed flow metering unit having a piston reciprocable within a tube in response to flow into said tube and through the actuator ports of an electro-hydraulic valve under test, electro-mechanical means for generating a single cycle of current to operate said valve, means including a resistance electrically connected with said valve for imposing an electrical signal responsive to said current upon a first axis of said two-axis recorder, a precision potentiometer connected with said D.C. voltage supply and mechanically coupled to said piston for relating linear position of said piston to potentiometer wiper position to produce a voltage signal responsive to piston displacement, and a differentiating circuit serially connected between said potentiometer and the second axis of a two-axis recorder to provide a signal proportional to fluid flow.

11. A valve flow analyzer comprising a two-axis recorder, an electric motor, a dual rotary potentiometer having a pair of wipers spaced 180° apart, gearing means coupling said motor to said wipers, said gearing means being adjustable for selection of the period of revolution of said wipers, mechanical means for limiting wiper rotation to a single revolution upon initiation of rotation, said potentiometer having a circular coil with taps 180° apart in operative relation with said wipers to produce during the revolution of said wipers a cyclic voltage signal at each wiper, the two signals being phased 180° apart, and amplifying means serially connected between said wipers and the coils of an electro-hydraulic valve under test to impose a cycle of differential current upon said coils, means for imposing a voltage responsive to said differential current upon a first axis of said recorder, a cylindrical tube, said tube being closed at each end and having a port at each end for fluid connection to the ports of said valve, a piston disposed within said tube, said piston being reciprocable in response to flow through said tube ports, a piston rod fixedly secured to said piston and extending through openings provided at the ends of said tube, said rod being of substantially smaller diameter than said piston, said tube and said piston being provided with smooth mating surfaces to render said piston moveable by low differential pressure thereacross for minimizing fluid leakage between said mating surfaces to produce piston velocity which is a function of true volumetric flow, a precision potentiometer mechanically coupled to said piston for relating linear position of said piston to potentiometer wiper contact position to produce a voltage signal responsive to piston displacement, and a precision capacitance and a precision resistance arranged to provide a differentiating circuit serially connected between said potentiometer and the second axis of said recorder to produce a voltage proportional to fluid flow through said actuator ports.

12. A valve flow analyzer comprising a flow metering unit having a piston movable within a tube in response to flow through the actuator ports of an hydraulic servo valve under test and into said tube, a two-axis recorder, means for producing an actuating input to said valve to effect a cycle of valve operation, means for producing an electrical signal responsive to said input and for imposing said signal upon a first axis of said recorder, and means for producing an electrical signal responsive to the velocity of said piston in said tube and for imposing it upon a second axis of said recorder.

13. A valve flow analyzer comprising a closed flow metering unit having a piston moveable within a tube in response to flow into said tube and through the actuator ports of an electro-hydraulic valve under test, a two-axis recorder, electro-mechanical means for generating a cycle of current for effecting a cycle of operation of said valve, means for adjusting the period and amplitude of said current cycle, means for imposing a voltage responsive to said current upon a first axis of said recorder, and means for producing an electrical signal responsive to the velocity of said piston in said tube and for imposing it upon a second axis of said recorder.

14. A flow metering device comprising a tube, a piston moveable within said tube in response to flow to said tube, an indicator, sensing means responsive to piston movement, and means connected with said sensing means for producing an electrical signal responsive to the velocity of said piston in said tube and for imposing said signal upon said indicator.

15. A flow metering device comprising a tube, a piston moveable within said tube in response to flow to said tube, a potentiometer connected with said piston for translating the position of said piston into an electrical signal, a D.C. voltage supply connected to said potentiometer, an indicator, and a differentiating circuit serially connected between the wiper of said potentiometer and said indicator to produce an indication of flow through said tube.

References Cited in the file of this patent
UNITED STATES PATENTS

| | | |
|---|---|---|
| 2,014,664 | Nicholls | Sept. 17, 1935 |
| 2,468,635 | Maystead | Apr. 26, 1949 |
| 2,503,052 | Keinath | Apr. 4, 1950 |
| 2,655,940 | Jackson | Oct. 20, 1953 |
| 2,736,008 | Miller | Feb. 21, 1956 |

FOREIGN PATENTS

| | | |
|---|---|---|
| 539,871 | Great Britain | Oct. 28, 1947 |